United States Patent
Miralles

(10) Patent No.: US 7,828,908 B1
(45) Date of Patent: Nov. 9, 2010

(54) ACID CLEANING AND CORROSION INHIBITING COMPOSITIONS COMPRISING GLUCONIC ACID

(75) Inventor: Altony Miralles, Woodbury, MN (US)

(73) Assignee: Ecolab USA, Inc., Saint Paul, MN (US)

( * ) Notice: Subject to any disclaimer, the term of this patent is extended or adjusted under 35 U.S.C. 154(b) by 0 days.

(21) Appl. No.: 12/751,674

(22) Filed: Mar. 31, 2010

(51) Int. Cl.
*B08B 3/04* (2006.01)

(52) U.S. Cl. .................. 134/28; 134/2; 134/3; 134/26; 134/30; 134/34; 134/35; 134/36; 134/41; 134/42; 510/245; 510/264; 510/501

(58) Field of Classification Search .................. 134/2, 134/3, 26, 28, 30, 34, 35, 36, 41, 42; 510/245, 510/264, 501
See application file for complete search history.

(56) References Cited

U.S. PATENT DOCUMENTS

| | | | |
|---|---|---|---|
| 3,438,799 A * | 4/1969 | Emmerichs et al. | 427/327 |
| 3,589,859 A | 6/1971 | Foroulis | |
| 3,595,799 A * | 7/1971 | Peterson | 510/533 |
| 3,711,246 A | 1/1973 | Foroulis | |
| 4,108,790 A | 8/1978 | Foroulis | |
| 4,539,122 A | 9/1985 | Son et al. | |
| 4,589,925 A * | 5/1986 | Young | 134/3 |
| 4,851,149 A | 7/1989 | Carandang | |
| 2003/0119691 A1 | 6/2003 | Smith et al. | |
| 2008/0300160 A1 | 12/2008 | Smith et al. | |
| 2009/0149363 A1 | 6/2009 | Smith et al. | |
| 2009/0152164 A1 | 6/2009 | Nguyen et al. | |
| 2009/0165818 A1 | 7/2009 | Smith et al. | |

FOREIGN PATENT DOCUMENTS

GB 2048311 A * 10/1980

OTHER PUBLICATIONS

Blume, W. J., "Role of Organic Acids in Cleaning Stainless Steels", ASTM STP 538, American Society for Testing and Materials, 1973, pp. 43-53.
Henthorne, Michael et al., "Passivation Treatments for Resulfurized Free Machining Stainless Steels", ASTM STP 538, American Society for Testing and Materials, 1973, pp. 90-105.
Poliakoff, M.Z., "Solvent Cleaners—Where and How to Use Them", ASTM STP 538, American Society for Testing and Materials, 1973, pp. 33-42.
Roberts, W. J., "Acid Cleaning of Stainless Steel", ASTM STP 538, American Society for Testing and Materials, 1973, pp. 77-89.
"Standard Recommended Practice for Cleaning and Descaling Stainless Steel Parts, Equipment, and Systems", American National Standard G, ASTM Designation: A 380-72, pp. 3-16.

* cited by examiner

*Primary Examiner*—Sharidan Carrillo
(74) *Attorney, Agent, or Firm*—McKee, Voorhees & Sease, P.L.C.

(57) ABSTRACT

A biodegradable acid cleaning composition for cleaning stainless steel, and other surfaces is disclosed. The composition comprises urea sulfate in combination with gluconic acid which serves as a corrosion inhibitor. The composition retains the cleaning and corrosion prevention properties of similar phosphoric acid solutions but is safe for the environment and is less expensive to produce. Applicants have surprisingly found that the traditionally alkaline corrosion inhibitor, gluconic acid, can work effectively in an acidic cleaning composition.

5 Claims, No Drawings

ACID CLEANING AND CORROSION INHIBITING COMPOSITIONS COMPRISING GLUCONIC ACID

FIELD OF THE INVENTION

The present invention relates to aqueous, acid cleaners for cleaning metal and other surfaces, particularly stainless steel and for inhibiting corrosion. Methods of use and manufacturing of the same are also disclosed.

BACKGROUND OF THE INVENTION

Steel is the generic name for a group of ferrous metals, composed principally of iron, which have considerable durability and versatility. By the proper choice of carbon content, addition of alloying elements, and by suitable heat treatment, different kinds of steel can be made for various purposes and the use in industry of all kinds of steel is now quite expansive.

Stainless steel is defined as a steel alloy, with a minimum of 11% chromium content by mass. Stainless steel does not stain, corrode, or rust as easily as traditional steel. There are over 150 different grades and surface finishes to allow the stainless steel to suit the environment in which it will be used. Stainless steel's low maintenance and relatively low cost make it an ideal base material for many commercial applications. It is used in cookware, cutlery, hardware, surgical instruments, major appliances, industrial equipment, it is also used as a structural alloy for cars and as a construction material for buildings.

Stainless steels have a passive film of chromium oxide that forms in the presence of oxygen due to the chromium present in the steel. This layer blocks most corrosion from spreading into the metal's internal structure. High oxidation resistance can be achieved with chromium additions of 13% by weight up to 26% for harsh environments. The chromium forms a passive layer of chromium III oxide ($Cr_2O_3$) when exposed to oxygen. To have their optimum corrosion resistance, stainless steel surfaces must be clean and have an adequate supply of oxygen to maintain this passive surface layer.

Cleaning of stainless steel includes the removal of various surface contaminants to ensure corrosion resistance, to prevent contamination, and to achieve the desired appearance of the steel. Acid cleaning is a process by which a solution of a mineral or organic acid in water sometimes in combination with a wetting agent or detergent or both, is employed to remove iron and other metallic contamination, light oxide films, soil and similar contaminants.

Acid cleaning compositions for removing contaminants from stainless steel generally have the mineral or organic acid in a solution with a pH of less than 7.0. The compositions typically remove both organic (dirt, oils) and inorganic (oxides, free iron) soils in the same operation. They also are used to improve corrosion resistance and enhance brightness of the base metal surface.

One of the problems which arises in the use of steel is its corrosion, either by the atmosphere or by the environment in which it is used. The rate of corrosion may vary, depending on the surrounding conditions and also the composition of the steel. Stainless steel, especially, is much more resistant to corrosion than plain carbon and other steels. This resistance is due to the addition of chromium to alloys of iron and carbon. Other metals, for example copper, and aluminum, also increase corrosion resistance but they are limited in their usefulness. Although stainless steel has appreciable resistance to corrosion, it will still corrode in certain circumstances and attempts have been made to prevent or reduce this corrosion. Most acid cleaners also include a corrosion inhibitor of some sort. For example, in acid media copper sulphate has been used as a corrosion inhibitor. However this and other proposed inhibitors are not entirely satisfactory since, like copper sulphate, they may be expensive, introduce an effluent disposal problem and, moreover, are not entirely effective. For example, when copper containing urea sulfate solutions are placed in contact with nickel metal, copper will plate the nickel surface.

A variety of compounds, including dialkylthioureas, such as diethylthiourea and dibutylthiourea, are known to reduce the corrosivity of sulfuric acid to carbon steels. Thioureas are not appropriate for food and beverage situations as any remnant thiol compounds are considered contamination for such surfaces.

The type of acid used has also presented problems in development of acid cleaners. Most acid cleaners are based upon phosphoric acid due to its low cost, good combining ability with other ingredients, its ability to exert a very strong synergistic cleaning affect, and its low corrosivity.

Phosphoric acid has recently fallen out of favor due to environmental concerns. It is therefore one object of this invention to provide a phosphate free acid cleaning composition which has equal or superior cleaning and corrosive inhibiting properties as phosphoric acid based cleaners.

It is another object of this invention to provide aqueous, urea sulfate based acid cleaning compositions which are relatively noncorrosive due to addition of gluconic acid, to stainless steel and which reduce the cost of such cleaners.

Yet another object is to provide a liquid acid cleaning composition for stainless steel which is biodegradable and which includes components which are generally recognized as safe.

Other objects, aspects and advantages of this invention will be apparent to one skilled in the art in view of the following disclosure, the drawings, and the appended claims.

SUMMARY OF THE INVENTION

The present invention employs the use of gluconic acid as a corrosion inhibitor for use in acid cleaning compositions. Applicants have found, surprisingly that the combination of gluconic acid as a corrosion inhibitor in an acidic cleaning solution works well and almost prohibits all corrosion. The invention employs an aqueous solution of a pH of less than 7, which uses an acid as the cleaning component. Any acid used in an acid cleaning composition may be combined with gluconic acid according to the invention, such as acetic acid, citric acid, oxalic acid, and sulfuric acid, all of which are traditionally used in acid cleaning compositions. In a preferred embodiment, the acid is sulfuric acid, which is more preferably combined with urea to form a urea sulfate acid cleaning composition. The acid cleaning compositions of the invention retain the anti-corrosive properties of phosphoric acid as well as the cleaning capabilities and are biodegradable and less expensive to produce.

Typical urea sulfate acid cleaners contain from about 5 to about 85, preferably about 10 to about 80 weight percent sulfuric acid; about 5 to about 75, preferably about 10 to about 70 weight percent urea; and 0 to about 75, usually 0 to about 50, and preferably 0 to about 25 weight percent water. Urea and sulfuric acid, in combination, constitute at least about 25, usually at least about 50, and preferably at least about 75 weight percent of the composition, and are present in relative proportions corresponding to urea/sulfuric acid molar ratios of more than 2 or less than 1.

According to the invention, urea and sulfuric acid, in combination, constitute at least about 25, usually at least about 50, and preferably at least about 75 weight percent of the composition, and are present in relative proportions corresponding to urea/sulfuric acid molar ratios of more than 2 or less than 1. The gluconic acid then, can be from about 0.1 up to 75% or greater of the composition, with the remainder being water.

Applicants have found that the level of gluconic acid to urea sulfate must be at least greater than about 0.15% to 25% or a ratio of percent by weight of 0.012 to 1 of gluconic acid to urea sulfate. Levels less than this critical ratio, were found to not significantly inhibit corrosion. There is really no upper limit on the amount of gluconic acid that can be added to the solution, so long as the desired corrosion inhibition is achieved with the acid cleaner. The solution could even have a greater gluconic acid content than urea sulfate. Not only does the gluconic acid protect the surface of the metal from the sulfuric acid, it makes the composition less expensive and retains the low corrosivity and cleaning properties of phosphoric acid based cleaners. Applicants have found that addition of the corrosion inhibitor gluconic acid which was thought to only work in alkaline cleaning compositions, surprisingly, also works in an acidic cleaning composition.

According to the invention it was found that gluconic acid inhibited corrosion of stainless steel and nickel metal at approximately 25% active urea sulfate concentration at room temperature. The corrosion exhibited in stainless steel 316 and 304, the most common types used, after cleaning with the compositions of the invention was an average of 0.1 mils per year, almost negligible levels. Further, the gluconic acid compositions of the invention protected stainless steel and nickel from corrosion at a 1% solution of urea sulfate at 160° F. For stainless steels 316 and 304 the average corrosion rate was 0.03 mils per year, again almost negligible.

The compositions of this invention can be produced by first reacting urea and sulfuric acid and, optionally water, by either batch or continuous processes, to which the gluconic acid is later added. While not wishing to be bound by any theory, it is postulated that the gluconic acid as well as other such acids which are intended to be within the scope of the invention, comprising a polyalcohol group at similar spacing of the carboxyl groups, coat the surface of the steel to provide a protective coating which prevents the sulfuric acid from corroding the same, even in acidic environments.

DETAILED DESCRIPTION

So that the invention maybe more readily understood, certain terms are first defined and certain test methods are described.

As used herein, "weight percent," "wt-%," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt-%," etc.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

As used herein, the term "phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than 0.5 wt %. More preferably, the amount of phosphate is less then 0.1 wt-%, and most preferably, the amount of phosphate is less than 0.01 wt %.

As used herein, the term "phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. More preferably, the amount of phosphorus is less than 0.1 wt-%, and most preferably the amount of phosphorus is less than 0.01 wt %.

"Cleaning" means to perform or aid in soil removal, bleaching, microbial population reduction, rinsing, or combination thereof.

As used herein, the term "ware" includes items such as eating and cooking utensils. As used herein, the term "warewashing" refers to washing, cleaning, or rinsing ware.

The term "about," as used herein, modifying the quantity of an ingredient in the compositions of the invention or employed in the methods of the invention refers to variation in the numerical quantity that can occur, for example, through typical measuring and liquid handling procedures used for making concentrates or use solutions; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities. All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers subsumed within that range (e.g. 1 to 5 includes 1, 1.5, 2, 2.75, 3, 3.80, 4, and 5).

According to the invention, application have created a phosphate free acid cleaning composition which may be used in place of traditional phosphoric acid cleaning compositions, which retains the cleaning and anti-corrosive properties of the same and which is biodegradable and less expensive to produce. The composition will find use in any cleaning situation where phosphoric acid based cleaners can be used, including, but not limited to, stainless steel.

Stainless steels are generally classified as carbon steels containing at least about 5 weight percent, usually about 5 to about 40 weight percent, and normally about 10 to about 25 weight percent chromium. They may also contain other alloying elements such as nickel, cerium, aluminum, titanium, copper, or other elements.

Stainless steels are usually classified in three different categories—austenitic, ferritic, and martensitic steels—which have in common the fact that they contain significant amounts of chromium and resist corrosion and oxidation to a greater extent than do ordinary carbon steels and most alloy steels.

Austenitic stainless steels or 300 series, make up about 70% percent of stainless steel production and are the most common alloys of this group. They contain a maximum of 0.25% carbon, a minimum of 16% chromium and sufficient nickel and manganese to retain an austenitic structure at all temperatures from the cryogenic region to the melting point of the alloy. For example type 309 has 0.20% chromium, type 310 has 0.25% and type 314 has 0.25%. A typical composition of 18% chromium and 10% nickel, commonly known as 18/10 stainless, is often used in flatware. AISI types 302, 303, 304, and 316 are several of the more extensively used austenitic stainless steels.

Ferritic stainless steels are highly corrosion-resistant, but less durable than austenitic grades. They are generally characterized, in part, by the fact that they contain chromium only (in addition to the other components of carbon steel) or only very minor amounts of alloying elements. Martensitic stainless steels re not as corrosion-resistant as the other two classes but are extremely strong and tough, as well as highly machineable, and can be hardened by heat treatment. Martensitic stainless steel contains chromium (12-14%), molybdenum (0.2-1%), nickel (0-<2%), and carbon (about 0.1-1%) (giving it more hardness but making the material a bit more brittle). It is quenched and magnetic.

Stainless Steel Grades

The SAE steel grades are the most commonly used grading system in the US for stainless steel.

100 Series—austenitic chromium-nickel-manganese alloys

Type 101—austenitic that is hardenable through cold working for furniture

Type 102—austenitic general purpose stainless steel working for furniture

200 Series—austenitic chromium-nickel-manganese alloys

Type 201—austenitic that is hardenable through cold working

Type 202—austenitic general purpose stainless steel

300 Series—austenitic chromium-nickel alloys

Type 301—highly ductile, for formed products. Also hardens rapidly during mechanical working. Good weldability. Better wear resistance and fatigue strength than 304.

Type 302—same corrosion resistance as 304, with slightly higher strength due to additional carbon.

Type 303—free machining version of 304 via addition of sulfur and phosphorus.

Type 304—the most common grade; the classic 18/8 stainless steel.

Type 304L—same as the 304 grade but contains less carbon to increase weldability. Is slightly weaker than 304.

Type 304LN—same as 304L, but also nitrogen is added to obtain a much higher yield and tensile strength than 304L.

Type 308—used as the filler metal when welding 304

Type 309—better temperature resistance than 304, also sometimes used as filler metal when welding dissimilar steels, along with inconel.

Type 316—the second most common grade (after 304); for food and surgical stainless steel uses; alloy addition of molybdenum prevents specific forms of corrosion. It is also known as marine grade stainless steel due to its increased resistance to chloride corrosion compared to type 304. 316 is often used for building nuclear reprocessing plants.[13]

Type 316L—extra low carbon grade of 316, generally used in stainless steel watches and marine applications due to its high resistance to corrosion. Also referred to as "A4" in accordance with ISO 3506.

Type 316Ti—includes titanium for heat resistance, therefore it is used in flexible chimney liners.

Type 321—similar to 304 but lower risk of weld decay due to addition of titanium. See also 347 with addition of niobium for desensitization during welding.

400 Series—ferritic and martensitic chromium alloys

Type 405—ferritic for welding applications

Type 408—heat-resistant; poor corrosion resistance; 11% chromium, 8% nickel.

Type 409—cheapest type; used for automobile exhausts; ferritic (iron/chromium only).

Type 410—martensitic (high-strength iron/chromium). Wear-resistant, but less corrosion-resistant.

Type 416—easy to machine due to additional sulfur

Type 420—Cutlery Grade martensitic; similar to the Brearley's original rustless steel. Excellent polishability.

Type 430—decorative, e.g., for automotive trim; ferritic. Good formability, but with reduced temperature and corrosion resistance.

Type 439—ferritic grade, a higher grade version of 409 used for catalytic converter exhaust sections. Increased chromium for improved high temperature corrosion/oxidation resistance.

Type 440—a higher grade of cutlery steel, with more carbon, allowing for much better edge retention when properly heat-treated Type 446—For elevated temperature service 500 Series—heat-resisting chromium alloys 600 Series—martensitic precipitation hardening alloys 601 through 604: Martensitic low-alloy steels.

610 through 613: Martensitic secondary hardening steels.

614 through 619: Martensitic chromium steels.

630 through 635: Semiaustenitic and martensitic precipitation-hardening stainless steels.

Type 630 is most common PH stainless, better known as 17-4; 17% chromium, 4% nickel.

650 through 653: Austenitic steels strengthened by hot/cold work.

660 through 665: Austenitic superalloys; all grades except alloy 661 are strengthened by second-phase precipitation.

The acid cleaning compositions of the invention can be used in any process that phosphoric acid cleaners have traditionally been used in, including but not limited to the stainless steel surfaces mentioned above. The absence of thiol compounds makes this cleaning composition acceptable for ware washing and cleaning of other surfaces that come into contact with food.

The composition of the invention will also find use in a number of de-liming situations as well. In one embodiment the composition may be used on stainless steel pipes which need to use acid cleaners to de-lime surfaces including clean in place applications where the cleaner is passed through the pipes. Other examples include vehicle cleaning applications to replace sulfuric acid as a presoak prior to alkaline washing solutions. Yet other examples include institutional water storage articles such as ice machines which need to be de-limed, in fact the compositions may be used in any situation where a surface needs to be cleaned due to hard water residue. The solutions of the invention may even find use in the replacement of formic acid as a sour rinse for textile processing, scale removal, manufacture of dyes and pigments for the removal of excessive nitrite from diazotization reactions, in paper manufacturing by reducing pulp degradation in the bleaching stages of electroplating, and as a catalyst in urea-formaldehyde resin manufacturing.

Gluconic acid is a mild organic acid formed by the oxidation of glucose whereby the physiological d-form is produced. It is also called maltonic acid, and dextronic acid. It has the molecular formula $C_6H_{12}O_7$ and condensed structural formula $HOCH_2(CHOH)_4COOH$. It is one of the 16 stereoisomers of 2,3,4,5,6-pentahydroxyhexanoic acid. In aqueous solution at neutral pH, gluconic acid forms the gluconate ion. Gluconic acid, gluconate salts, and gluconate esters occur widely in nature because such species arise from the oxidation of glucose. The chemical structure of gluconic acid consists of a six-carbon chain with five hydroxyl groups terminating in a carboxylic acid group.

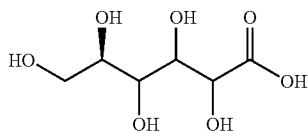

In aqueous solution, gluconic acid exists in equilibrium with the cyclic ester Glucono delta lactone.

According to the invention, gluconic acid is added as a corrosion inhibitor to acid cleaning compositions. Applicants have found that the acid, traditionally used in alkaline solutions as a corrosion inhibitor, surprisingly works in an aqueous acid cleaning composition to inhibit corrosion to almost negligible levels. It is postulated that other polyhydroxy carboxylic acids useful will contain from 4 to 10 carbon atoms, with similar location of the carbon atoms and similar polyol grouping. Preferred is gluconic acid.

The present invention employs the use of gluconic acid as a corrosion inhibitor for use in acid cleaning compositions comprising preferably urea and sulfuric acid, or urea sulfate. Typical urea sulfate acid cleaners contain from about 5 to about 85, preferably about 10 to about 80 weight percent sulfuric acid; about 5 to about 75, preferably about 10 to about 70 weight percent urea; and 0 to about 75, usually 0 to about 50, and preferably 0 to about 25 weight percent water. Urea and sulfuric acid, in combination, constitute at least about 25, usually at least about 50, and preferably at least about 75 weight percent of the composition, and are present in relative proportions corresponding to urea/sulfuric acid molar ratios of more than 2 or less than 1.

According to the invention, urea and sulfuric acid, in combination, constitute at least about 25, usually at least about 50, and preferably at least about 75 weight percent of the composition, and are present in relative proportions corresponding to urea/sulfuric acid molar ratios of more than 2 or less than 1.

Applicants have found that the level of gluconic acid to urea sulfate must be at least greater than about 0.15% to 25% or a ratio of percent by weight of 0.012 to 1 of gluconic acid to urea sulfate. There is really no upper limit on the amount of gluconic acid that can be added to the solution, so long as the desired corrosion inhibition is achieved with the acid cleaner. The solution could even have a greater gluconic acid content than urea sulfate. Not only does the gluconic acid protect the surface of the metal from the sulfuric acid, it makes the composition less expensive and retains the anti-corrosive and cleaning properties of phosphoric acid based cleaners. Applicants have surprisingly found that addition of the corrosion inhibitor gluconic acid, which was thought to only work in alkaline cleaning compositions, instead works in an acidic cleaning composition.

According to the invention it was found that gluconic acid inhibited corrosion of stainless steel and nickel metal at approximately 25% active urea sulfate concentration at room temperature. The corrosion exhibited in stainless steel 316 and 304, the most common types used, after cleaning with the compositions of the invention, was an average of 0.1 mils per year, almost negligible levels. Further, the gluconic acid composition of the invention protected stainless steel and nickel from corrosion at a 1% solution of urea sulfate at 160° F. For stainless steels 316 and 304 the average corrosion rate was 0.03 mils per year, again almost negligible.

The compositions of this invention can be produced by first reacting urea and sulfuric acid and, optionally water, by either batch or continuous processes, to which the gluconic acid is later added.

While not wishing to be bound by any theory, it is postulated that the gluconic acid as well as other such acids which are intended to be within the scope of the invention, comprising a polyalcohol group and similar spacing of the carboxyl groups, coat the surface of the steel to provide a protective coating which prevents the sulfuric acid from corroding the same, even in acidic environments.

When the acid cleaning composition is used, the pH value of the use solution should be below 5.

The aqueous solutions according to the invention may also contain other components, if this appears to be desirable. In many cases it is advisable to add surfactants in order to encourage a simultaneous cleaning and degreasing effect, and to ensure satisfactory wetting of the surfaces being treated with the acid cleaning composition. The desired amount of the surfactants may be added directly to the treatment solution, but it is preferable to add them to the concentrate used in producing the solution.

In addition to the main components other additive may be added to the compositions depending upon the soils to be removed, the stainless steel or other material to be cleaned, the requiring inhibiting affects, the desired final surface properties and the waste disposal requirements and economic considerations. Other additives may also be included including but not limited to wetting agents to lower solution surface tension, solvents to aid in the removal of hydrophobic soils, defoamers to prevent foam or foam buildup on solution surface, thickeners (acid stable) to allow the cleaner to adhere (cling to vertical surface), passivators to protect the surface from environmental attack, and biocides to control odor problems and kill harmful bacteria. Dyes, and other components may also be added.

The term "surfactant" or "surface active agent" refers to an organic chemical that when added to a liquid changes the properties of that liquid at a surface.

Aesthetic enhancing agents such as colorants and perfume are also optionally incorporated into the concentrate composition of the invention. Examples of colorants useful in the present invention include but are not limited to liquid and powdered dyes from Milliken Chemical, Keystone, Clariant, Spectracolors, and Pylam.

Examples of perfumes or fragrances useful in concentrate compositions of the invention include but are not limited to liquid fragrances from J&E Sozio, Firmenich, and IFF (International Flavors and Fragrances).

2It should be understood that the water provided as part of the solution or concentrate can be relatively free of hardness. It is expected that the water can be deionized to remove a portion of the dissolved solids. The concentrate is then diluted with water available at the locale or site of dilution and that water may contain varying levels of hardness depending upon the locale. Although deionized is preferred for formulating the concentrate, the concentrate can be formulated with water that has not been deionized. That is, the concentrate can be formulated with water that includes dissolved solids, and can be formulated with water that can be characterized as hard water.

Examples of useful ranges for the basic composition for the acid cleaning composition of the invention include those provided in the following table:

| Component | Weight percent | Weight percent | Weight percent |
|---|---|---|---|
| urea sulfate | 1-90 | 1-50 | 15-40 |
| gluconic acid | 0.1-90 | .1-50 | .1-40 |

In an alternate embodiment, the cleaning compositions can be prepared according to the present invention include those provided in the following table:

| Component | Weight percent | Weight percent | Weight percent |
|---|---|---|---|
| urea | 1-90 | 1-50 | 15-40 |
| sulfuric acid | 1-90 | 1-50 | 10-35 |
| gluconic acid | 0.1-10 | 0.2-8 | 0.5-3 |

The urea-sulfate/gluconic acid compositions of this invention can be produced by the reaction of urea and sulfuric acid and, optionally water, by either batch or continuous process with the addition of gluconic acid and any other excipients thereafter.

Generally, the reaction products can be produced by separately and simultaneously feeding urea, sulfuric acid, and optionally water, as required by stoichiometry, into a reacting liquid phase contained in a reaction zone, in proportions corresponding to the relative proportion of each respective component in a predetermined product composition within the ranges discussed herein. The urea and sulfuric acid react within the reaction zone under controlled conditions in which reaction temperature is always maintained at a point below about 176° F., and below the incipient decomposition temperature of the predetermined product.

Use of acid cleaners may involve an alkaline clean with a detergent product and rinse, either prior to or after application of the acid cleaner and then a subsequent cold water rinse. In certain embodiments such as stainless steel cleaning, the final cold water rinse may be followed with electroplating, chemical polishing, electropolishing, air blow drying, passivation treatments, neutralization treatments and the like.

The invention has been shown and described herein in what is considered to be the most practical and preferred embodiment. The applicant recognizes, however, that departures may be made therefrom within the scope of the invention and that obvious modifications will occur to a person skilled in the art. The examples which follow are intended for purposes of illustration only and are not intended to limit the scope of the invention. All references cited herein are hereby incorporated in their entirety by reference.

EXAMPLES

Metal Corrosion Test

The following test method describes an accepted, but not exclusive, procedure for metal corrosion testing as outlined in the American Society for Testing and Materials (ASTM), Volume 3.02, G31-72 and 3.02, G1-90, and as outlined in the Klenzade Good Laboratory Practice standard test method, K004-01-01, which is in compliance with Environmental Protection Agency (EPA) registration and UN/DOT for corrosion testing. This test method was employed in Examples 2 and 3.

Metal strips are pre-cleaned, weighed, and put into glass bottles with product solution (100% concentration for UN/DOT) and placed at appropriated temperature (130° F. (54.5° C.) for UN/DOT). After the specified time, the corroded metal strips are then cleaned, weighed, and weight loss is determined. Corrosion rates are directly proportional to the mass loss of the metal strip and inversely proportional to the strip area, density, and time of exposure to the test solution. A corrosion rate exceeding 250 mpy is classified as UN/DOT corrosive to the test metal.

Metal Strip Preparation—Pre-Cleaning

1. Identify each metal strip by using steel tencil stamp. Prepare at least duplicates per test condition and metal type, and duplicate controls per metal type being tested.
2. Pre-clean all metal strips.
3. Clean soft metals such as galvanized steel (zinc), aluminum, brass, copper, and nickel with detergent (EXPRESS) and a soft sponge. Then, ultrasonic clean in toluene for 30 minutes. Scrubbing with an abrasive powder and a pad can mar the surface, increasing surface area which could increase corrosion results.
4. To clean hard metals, such as cold rolled steel 1018 and stainless steel 304 y 316, scrub with bleach-free scouring powder, Bon Ami.
5. Rinse metal strips with distilled water followed with an acetone rinse.
6. Let metal strips air dry. Store strips in desiccator until used. Aluminum and copper should be stored a minimum of 24 hours in a desiccator before testing to allow protective coatings to reform on the test panel surface.
7. Weigh the clean, dry, metal strips and controls (precleaning weight) on an analytical balance. EPA GLP work must be weighed on an approved balance.

Test Conditions

1. Determine temperature desired for testing. Temperature of testing is generally ambient (68-72° F.) for EPA GLP or 130° F. for UN/DOT.
2. Label containers. The standard container is a one-liter, wide-mouth glass jar. Test metal strips should be supported in the standard container so that the metal strip is no less than 45 degrees relative to the horizontal plane. Glass panels are inserted vertically in the standard container as a support with the metal strip resting against it with as little contact as possible to obtain this angle.

3. Make desired test concentrations. Solutions should be made on a percent by weight basis. For UN/DOT testing, product is undiluted, 100% concentration. Test volume should be approximately 125 ml per square inch of metal strip surface area, i.e., a 1"×3" metal strip requires 750 ml of test solution; a 0.5"×4" metal strip requires 500 ml of test solution.

4. The length of exposure should be determined using the following guideline:
   Number of hours=2000/mpy (estimated)
   Typically, the exposure time is not less than eight hours or longer than 168 hours. For UN/DOT testing, standard time is eight hours.

Test Procedure
1. Preheat water bath if necessary.
2. Preheat test solution to test temperature.
3. Pour desired test concentration, as determined by Step 3 in Test Conditions section, per size of metal strip into standard containers. Put strips in test solution, apply caps. Controls are not exposed to either test solution or water. See step 2 in Cleaning Metal Strips After Testing—Post-Cleaning Section.
4. At the end of test time, remove metal strips from the container and rinse with distilled water.

Cleaning Metal Strips after Test—Post-Cleaning
1. The metal strips are chemically cleaned to remove the corroded metal from the surface by dissolution in an appropriated chemical solution. See Table 1 attached to determine time, temperature, and solution to use. After metal strips are exposed to the appropriated chemical solution, rinse with distilled water, followed by an acetone rinse. Let air dry. Analytically weigh metal strips (post-cleaning weight).

2. At the same time the test strips are post-cleaned, the controls are also post-cleaned in the appropriated chemical solution per metal type. An ideal procedure should remove only corroded metal, not base metal. To determine the mass loss of the base metal, the controls are post-cleaned. Analytically weigh controls. This weight loss by the control strips is the cleaning weight loss (CWL).

Calculations
1. Calculate the total weight loss (TWL) for each test strip.

TWL=Pre-cleaning weight−Post-cleaning weight

2. Calculate the cleaning weight loss (CWL) experienced by the control strips per metal type tested.

CWL=Pre-cleaning weight of controls−Post cleaning weight of controls

3. Calculate the adjusted weight loss (AWL).

AWL=TWL−CWL

4. Calculate the corrosion rate in mils per year (mpy) for each strip.

mpy=(534,000*AWL)/($A*T*D$)

A=area in inches squared (6 sides)
   i.e., 1"*3"*1/16"=2(1*3)+2(0.0625*1)+2(0.0625*3)=6+0.125+0.375=
   6.5 inches squared
   i.e., 0.5"*4"*1/8"=2(0.5*4)+2(0.125*0.5)+2(0.125*4)=4+0.125+1=5.125 inches squared
   T=Time exposure (hours)
   D=Metal density (g/cm3)
   AWL=Adjusted weight loss (grams)

5. Calculate the average corrosion rate for each set of metal strips. A product causing a corrosion rate larger than 250 mpy is considered corrosive to that specific metal by DOT and the UN.

TABLE 1

| METAL | PRE-CLEANING METHOD | POST-CLEANING METHOD | | | | DIMENSION | | | | MLS TEST SOLUTION ml |
|---|---|---|---|---|---|---|---|---|---|---|
| | | TIME Min. | TEMP °F. | SOLUTION | DENSITY g/cc | HEIGHT In | WIDTH In | THICK In | AREA In$^2$ | |
| ALUMINUM 7075 | SOFT | 3 | ROOM TEMP | CONC HNO$_3$ | 2.81 | 3 | 1 | 0.0625 | 6.5 | 750 |
| BRASS B380, 7030 | SOFT | 3 | ROOM TEMP | 1:1 CONC HCl/H20 | 8.5 | 3 | 1 | 0.0625 | 6.5 | 750 |
| COPPER | SOFT | 3 | ROOM TEMP | 1:1 CONC HCl/H20 | 8.96 | 3 | 1 | 0.0625 | 6.5 | 750 |
| C.R. STEEL 1018 | HARD | 3 | ROOM TEMP | 1000 ml CONC HCl 20 g ANTIMONY TRIOXIDE (Sb$_2$O$_3$) 50 G STANNOUS CHLORIDE (SnCl$_2$) | 7.86 | 4 | 0.5 | 0.125 | 5.125 | 500 |
| GALVANIZED STEEL (ZINC) G90-LFQ-RSCT | SOFT | 5 | ROOM TEMP | 100 G AMMONIUM PERSULFATE/1 L ((NH$_4$)$_2$S$_2$O$_8$) | 8.78 | 3 | 1 | 0.0375 | 6.3 | 750 |
| NICKEL 200 | SOFT | 3 | ROOM TEMP | 150 G HCl/1 L | 8.89 | 3 | 1 | 0.0625 | 6.5 | 750 |
| SS 304, BRUSHED #4 | HARD | 20 | 70° C./158° F. | 150 g DIAMMONIUM CITRATE/1 l ((NH$_4$)$_2$HC$_6$H$_5$O$_7$) | 7.94 | 3 | 1 | 0.0625 | 6.5 | 750 |
| SS 316, BRUSHED #4 | HARD | 20 | 70° C./158° F. | 150 g DIAMMONIUM CITRATE/1 l ((NH$_4$)$_2$HC$_6$H$_5$O$_7$) | 7.98 | 3 | 1 | 0.0625 | 6.5 | 750 |

Example 2

Project: Urea Sulfate Corrosion

Begin Urea Sulfate+Gluconic Acid Corrosion Test

1 L of an acid cleaning solution of urea sulfate+gluconic acid solution was made for testing corrosion

| weight | % | |
|---|---|---|
| 715.4 | 71.54 | Water |
| 166.6 | 16.66 | H2SO4 93% |
| 115.0 | 11.50 | Urea Prill |
| 3.0 | 0.30 | Gluconic acid 50% |
| 1000.0 | 100.00 | |

One coupon each of Ni, 304SS, 316SS, 410SS were tested. Each coupon was placed in an 8 oz glass bottle and submerged with ~200 mL concentrated urea sulfate+gluconic acid solution. The bottles were then placed in a preheated water bath at set at 160° F.

Next one coupon each of Ni, 304SS, 316SS, 410SS were tested by placing 2 drops concentrated urea sulfate+gluconic acid solution on top of coupon near the middle and the coupons were let sit at room temp. No obvious initial reaction between solution and any of the coupons was observed.

The 410SS and 304SS coupons were removed from water bath after one hour and 15 minutes because both failed. The solutions were green with lots of bubbles forming in bottles.

Next 300 mL of urea sulfate+gluconic (2×) acid was made and a test began for the 410SS in water.

| 213.7 | 71.24 | Water |
|---|---|---|
| 50.0 | 16.66 | H2SO4 93% |
| 34.5 | 11.50 | Urea Prill |
| 1.8 | 0.60 | Gluconic acid 50% |
| 300.0 | 100.00 | |

Corrosion Test:

Later the 410SS coupon was removed from bath in morning because of failure, the solution was green and coupon was paper thin (most was corroded away).

The 316SS and Ni coupons were removed from the bath at 24 hours. The 316SS coupon solution was light green with slight bubble formation in bottle. The Ni coupon solution was observed to be slight yellow with very slight bubble formation.

The coupons were then rinsed at room temperature with deionized water and blotted dry. None of the coupons showed any evidence of corrosion, all were still shiny.

Example 3

Urea Sulfate+Gluconic Acid Corrosion Test Preparation

Coupons were weighed and measured coupons for compatibility testing per the table below.

| | coupon | length (in) | width (in) | depth (in) | surface area (SA) (in^2) | Initial weight (g) |
|---|---|---|---|---|---|---|
| | | | Ni | | | |
| 100% solution | 1 | 3.006 | 1.000 | 0.063 | 6.517 | 27.1555 |
| | 2 | 3.015 | 1.003 | 0.062 | 6.546 | 27.1332 |
| | 3 | 3.004 | 1.001 | 0.062 | 6.511 | 26.8191 |
| | | | 316SS | | | |
| 100% solution | 1 | 3.003 | 0.997 | 0.060 | 6.468 | 23.1391 |
| | 2 | 3.003 | 0.998 | 0.060 | 6.474 | 23.1836 |
| | 3 | 3.002 | 0.996 | 0.060 | 6.460 | 23.1484 |
| | | | 304SS | | | |
| 100% solution | 1 | 3.002 | 0.999 | 0.058 | 6.462 | 22.2192 |
| | 2 | 3.011 | 0.998 | 0.058 | 6.475 | 22.2454 |
| | 3 | 3.010 | 0.999 | 0.058 | 6.479 | 22.2686 |
| | | | 410SS | | | |
| 100% solution | 69 | 3.006 | 1.004 | 0.050 | 6.437 | 19.0677 |
| | 70 | 3.006 | 1.005 | 0.050 | 6.443 | 19.0878 |
| | 71 | 3.004 | 1.006 | 0.050 | 6.445 | 19.0685 |

Urea Sulfate+Gluconic Acid Room Temp Corrosion Test:

24 L of urea sulfate+gluconic acid solution was prepared for corrosion testing.

| 1717.0 | 71.54 | water |
|---|---|---|
| 399.8 | 16.66 | H2SO4 93% |
| 276.0 | 11.50 | prilled urea |
| 7.2 | 0.30 | gluconic acid 50% |
| 2400.0 | 100.00 | |

~200 mL was poured in each 8 oz. glass bottles with respective cleaned coupons as detailed below.

The Nickel coupon was cleaned with mild detergent then sonicated in toluene for 30 min. before rinsing with acetone. The stainless steel coupons were cleaned with Bon Ami and rinsed with acetone. The bottles were set at room temp to begin test at 10:00 a.m. By 2:00 p.m., 410SS coupons failed (solution green with bubble formation).

End Urea Sulfate+Gluconic Acid Room Temp Corrosion Test:

The metal corrosion test was ended at 10:00 am after 24 hours. All coupons were removed from bottles. The 410SS coupons failed, all others were rinsed with deionized water.

The coupons were cleaned. The nickel coupons were placed in a 200 mL HCL solution for 3 min. at room temp (150 gHCL:1 L deionized water), rinsed with deionized water, then acetone. The stainless steel coupons were placed in a 200 mL diammonium citrate solution (150 g diammonium citrate:1 L DI water) for 20 min. at 70° C., rinsed with deionized water, then acetone.

The coupons were then weighed and mils per year (mpy) were calculated for each.

| coupon | final weight (g) | TWL (g) | mpy | final observations |
|---|---|---|---|---|
| | | Ni | | |
| 100% solution 1 | 27.1546 | 0.0009 | 0.3457 | no change |
| 100% solution 2 | 27.1312 | 0.0020 | 0.7646 | no change |
| 100% solution 3 | 26.8193 | −0.0002 | −0.0769 | no change |
| | | 316SS | | |
| 100% solution 1 | 23.1392 | −0.0001 | −0.0431 | no change |
| 100% solution 2 | 23.1835 | −0.0001 | 0.0431 | no change |
| 100% solution 3 | 23.1486 | −0.0002 | −0.0863 | no change |
| | | 304SS | | |
| 100% solution 1 | 22.2192 | 0.0000 | 0.0000 | no change |
| 100% solution 2 | 22.2459 | −0.0005 | −0.2164 | no change |
| 100% solution 3 | 22.2691 | −0.0005 | −0.2163 | no change |
| | | 410SS | | |
| 100% solution 69 | failed | — | — | green solution, black coupons |
| 100% solution 70 | failed | — | — | green solution, black coupons |
| 100% solution 71 | failed | — | — | green solution, black coupons |

Urea Sulfate+Gluconic Acid Room Temp Use Solution Corrosion Test—

600 ml of Urea Sulfate+Gluconic (2×) Acid (4% Solution) was Made for Corrosion Testing

| | | |
|---|---|---|
| 593.10 | 98.85 | water |
| 4.00 | 0.67 | H2SO4 93% |
| 2.76 | 0.46 | prilled urea |
| 0.14 | 0.02 | gluconic acid 50% |
| 600.0 | 100.00 | |

One each of Ni, 304SS and 316SS coupons was cleaned. The Ni coupon was cleaned with mild detergent, and then sonicated in toluene for 30 min before rinsing with acetone. The stainless steel coupons were cleaned with Bon Ami and rinsed with acetone. Approximately 200 mL was poured in 8 oz glass bottles with respective cleaned weighed coupons.

| Coupon | Wt (g) |
|---|---|
| Ni | 26.7992 |
| 304SS | 22.4941 |
| 316SS | 23.1141 |

All coupons were removed from bottles and rinsed with deionized water.

The coupons were cleaned again per the post cleaning method. The nickel coupon was placed in 150 mL HCL solution at room temp for 3 min., rinsed with deionized water, then acetone. The stainless steel coupons were placed in 150 mL diammonium citrate solution at 70° C. for 20 min., rinsed with deionized water, then acetone. The coupons were weighed and the mils per year (mpy) were calculated for each. The solutions with 316SS and 304SS had slight bubble formation.

| coupon | final weight (g) | TWL (g) | mpy | final observations |
|---|---|---|---|---|
| | | Ni | | |
| 4% solution 1 | 26.7945 | 0.0047 | 1.8108 | no change |
| | | 316SS | | |
| 4% solution 1 | 23.1148 | −0.0007 | −0.3012 | no change |
| | | 304SS | | |
| 4% solution 1 | 22.4945 | −0.0004 | −0.1734 | no change |

End Urea Sulfate+Gluconic Acid Temp 160° F. Solution Corrosion Test—:

At the end of the test, all coupons were removed from the bottles and rinsed with water. The coupons were cleaned. The nickel coupon was placed in 150 g HCL solution at room temp for 3 min., rinsed with DI water then acetone. The stainless steel coupons were placed in 150 mL diammonium citrate solution at 70° C. for 20 min., rinsed with DI water, then acetone. The coupons were weighed and mpy was calculated for each.

| coupon | final weight (g) | TWL (g) | mpy | final observations |
|---|---|---|---|---|
| | | Ni | | |
| 4% solution 1 | 26.7715 | 0.0230 | 8.8616 | slt white film |
| | | 316SS | | |
| 4% solution 1 | 23.1152 | −0.0004 | −0.1721 | no change |
| | | 304SS | | |
| 4% solution 1 | 22.4946 | −0.0001 | −0.0434 | no change |

What is claimed is:

1. A method of cleaning stainless steel and/or other metals, of organic and inorganic soils while improving corrosion resistance and brightness comprising the steps of:
    cleaning stainless steel and/or other metals by contacting a surface of said stainless steel and/or other metals with an aqueous urea sulfate cleaning composition consisting of about 0.60% by weight of gluconic acid, urea, sulfuric acid, and water and thereafter rinsing the surface of said stainless steel and/or other metals to remove organic and inorganic soils therefrom.

2. The method of claim 1 further comprising the step of: heating the aqueous urea sulfate cleaning composition to a temperature of 120 to 160 degrees F.

3. The method of claim 1 further comprising the step of cleaning the surface of said stainless steel and/or other metals with an alkaline detergent product prior to said contacting step.

4. The method of claim 1, wherein said stainless steel and/or other metals are cleaned in place.

5. The method of claim 1, wherein the aqueous urea sulfate cleaning composition consists of: about 17% by weight of said sulfuric acid, about 11% by weight of said urea, about 0.60% by weight of said gluconic acid, with the remaining balance being water.

* * * * *